(12) United States Patent
Hakim

(10) Patent No.: US 11,535,528 B1
(45) Date of Patent: Dec. 27, 2022

(54) STORMWATER CAPTURE HOUSING SYSTEM

(71) Applicant: State of California, Department of Transportation, Sacramento, CA (US)

(72) Inventor: Cornelis M. Hakim, Sacramento, CA (US)

(73) Assignee: State of California, Department of Transportation, Sacramento, CA (US)

( * ) Notice: Subject to any disclaimer, the term of this patent is extended or adjusted under 35 U.S.C. 154(b) by 0 days.

(21) Appl. No.: 17/822,427

(22) Filed: Aug. 25, 2022

Related U.S. Application Data

(60) Provisional application No. 63/389,238, filed on Jul. 14, 2022.

(51) Int. Cl.
| | |
|---|---|
| *E03F 5/14* | (2006.01) |
| *C02F 1/00* | (2006.01) |
| *E03F 5/04* | (2006.01) |
| *E03F 5/10* | (2006.01) |
| *C02F 103/00* | (2006.01) |

(52) U.S. Cl.
CPC ............ *C02F 1/004* (2013.01); *E03F 5/0404* (2013.01); *E03F 5/101* (2013.01); *E03F 5/14* (2013.01); *C02F 2103/001* (2013.01); *C02F 2201/004* (2013.01)

(58) Field of Classification Search
CPC ............ E03F 5/0404; E03F 5/101; E03F 5/14
USPC .................... 210/163, 164, 170.03, 747.3
See application file for complete search history.

(56) References Cited

U.S. PATENT DOCUMENTS

| | | | |
|---|---|---|---|
| 5,562,819 A | 10/1996 | Turner, Jr. | |
| 5,643,445 A * | 7/1997 | Billias | E03F 5/14 |
| | | | 210/163 |
| 6,080,307 A * | 6/2000 | Morris | E03F 5/0404 |
| | | | 210/163 |
| 6,478,954 B1 * | 11/2002 | Turner, Jr. | E03F 5/12 |
| | | | 210/170.03 |
| 7,022,243 B2 | 4/2006 | Bryant | |
| 7,083,721 B2 | 8/2006 | McClure et al. | |
| 7,294,256 B2 | 11/2007 | Happel | |
| 10,384,956 B1 | 8/2019 | Happel | |
| 11,326,336 B2 * | 5/2022 | Zarraonandia | E03F 5/101 |
| (Continued) | | | |

FOREIGN PATENT DOCUMENTS

DE          29502895    *  6/1995

*Primary Examiner* — Christopher Upton
(74) *Attorney, Agent, or Firm* — Michelle C. Lau

(57) ABSTRACT

A stormwater capture housing system designed to reduce greenhouse gas emissions by filtering solid waste from stormwater flow in roadways, transportation facilities, and pavement, while maintaining an optimal flow rate and enabling safe accessibility. The system comprises a housing unit with top grates that enable stormwater and solid waste to drain from the roadway into a sub-grade capture area formed by a screen weir and a screen box. The screen box ensures that the solid waste is collected while the water filters into a clean water area. The screen weir also filters solid waste and is further configured to allow for an overflow of stormwater and solid waste. Another section of the top wall has a filled grating configuration that allows for stormwater to drain without passing any solid waste to prevent flooding, also enabling access to the internal components of the housing system.

20 Claims, 24 Drawing Sheets

(56) References Cited

U.S. PATENT DOCUMENTS

| | | | |
|---|---|---|---|
| 2005/0051499 A1* | 3/2005 | Nino ..................... | E03F 5/0404 210/163 |
| 2018/0106029 A1* | 4/2018 | Napierski ................. | E03F 5/14 |

* cited by examiner

STORMWATER CAPTURE HOUSING SYSTEM

CROSS-REFERENCE TO RELATED APPLICATIONS

This application claims the benefit of provisional U.S. Patent Application entitled "Stormwater Capture Housing System," having Ser. No. 63/389,238, filed Jul. 14, 2022, which is incorporated by reference in its entirety as if fully set forth herein.

FIELD OF THE INVENTION

The present invention generally relates to climate change mitigation technologies that reduce greenhouse gas (GHG) emissions related to solid waste collection. More specifically, the present invention relates to a fixed stormwater drainage structure for use in roads or pavements with a permanent filtering device to remove solid waste from stormwater.

BACKGROUND OF THE INVENTION

Proper management of roadside trash provides direct aesthetic, social, and environmental benefits. Preservation of roadside landscapes contributes to the overall health and welfare of natural resources and communities. Direct environmental benefits include preservation of wildlife, ecosystems, and natural resources. In addition to the protection of aquatic and marine ecosystems, proper trash management helps reduce and avoid greenhouse gas (GHG) emissions. Proper management of roadside trash reduces GHG emissions by avoiding direct emissions from trash breakdown, reducing overall product lifecycle emissions through materials recovery and recycling, and avoiding indirect effects from ecosystems disruptions that can shift an ecosystem's carbon balance away from being a beneficial carbon sink towards becoming a problematic carbon source. Microplastics impair the growth and photosynthesis capacity of phytoplankton, the microorganisms relied on for producing oxygen. Microplastics also have a toxic effect on zooplankton, which impacts the essential functioning of all aquatic food webs. Further, microplastics bind with clumps of bacteria, plankton, and other organic material that sinks down into the ocean depth, acting like a biological carbon pump, and hence risk decreasing the capacity of the ocean to absorb and sequester carbon from the atmosphere.

GHGs are currently of high interest in the state of California as the State works toward a 2030 goal of reducing its GHG emissions by 40% below 1990 levels. One of the six expressly stated goals of the California Department of Transportation (Caltrans) per its strategic plan of 2020-2024 is to lead climate action, currently focusing on addressing GHG emissions. The direct GHG emissions from roadside trash materials are largely dependent on waste management endpoints, and the collection process itself is a source of GHG emissions when vehicles and equipment are employed for the collection efforts. Direct emissions are generated by sources within Caltrans' organized boundaries and within the ownership and control of Caltrans, including tailpipe emissions from Caltrans-owned vehicles deployed for trash management services. Indirect emissions are generated by production of gasoline and diesel fuels used by Caltrans' vehicles and by utility-generated electricity that powers Caltrans' electric vehicles.

For the protection of beneficial uses of aquatic and marine environments and to reduce GHG emissions, Caltrans is developing techniques to prevent solid waste from entering drainage systems and being swept into waterways and oceans and to improve collection efforts in order to reduce deployment of vehicles. Capturing trash prevents detrimental impacts to ocean plankton, which ultimately reduces effects of GHGs. Current trash capture configurations are not always suitable for the streets and highways due to the dynamic problems affecting stormwater flow, including heavier vehicles, challenging site conditions, and environmental changes. Existing configurations have limited utility due to increased potential for roadway flooding, traffic complications, shallow drainage conditions, worker safety, and water pollution associated with stormwater drainage. Solid waste, like trash and debris, easily finds a way into the stormwater system and, unlike wastewater that flows through a treatment system, in many instances stormwater may be released directly to the local waterways, rivers, and ocean. In most places, local cities and counties get their drinking water from the rivers after being discharged by upstream cities. Urban runoff remains one of the nation's most significant sources of water pollution. Further, the United States Environmental Protection Agency maintains that recovery and recycling of waste materials can lead to substantial reductions in GHG emissions.

To remediate this widespread issue and comply with Federal Clean Water Act mandates, Caltrans has issued new design objectives and requirements to develop a multi-benefit, low impact control system that traps all particles 5 mm or greater, with a treatment capacity that is either not less than the peak flow rate resulting from a one-year, one-hour storm in the subdrainage area or sized to carry at least the same flows as the corresponding storm drain.

The present invention meets these new design objectives and requirements, providing additional functionality by serving ancillary interests related to safety, accessibility, reliability, maintenance, and environmental interests.

SUMMARY OF THE INVENTION

The present invention is a stormwater capture housing system that filters solid waste from stormwater flow in roadways, transportation facilities, and pavement, while maintaining an optimal flow rate and enabling safe accessibility. The system comprises a rectangular housing unit that has a top wall level with the surrounding terrain. The top wall has a section with open slotted grating configuration that enables stormwater and solid waste to enter from the roadway into the housing unit, draining only into a subgrade capture area contained by a screen weir and a screen box. The screen box ensures that the solid waste is collected while the water filters into a clean water area. The screen weir also filters solid waste and is further configured to allow for an overflow of stormwater and solid waste. Another section of the top wall has a filled inflow grating configuration that allows for stormwater to drain without passing any solid waste. This section also enables safe access to the internal components of the housing system. Additional inflow from upstream stormwater sources is enabled by an addition of inlet conduits. There is at least one outflow conduit that discharges the stormwater from the capture housing unit.

BRIEF DESCRIPTION OF THE DRAWINGS

These and other features, aspect, and advantages of the present invention will become better understood with respect to the following descriptions, appended claims, and accompanying drawings where:

DESCRIPTION

Design objectives for the present invention include compliance with requirements specified in the Caltrans Statewide National Pollution Discharge Elimination System (NPDES) Storm Water Permit No. 2012-0011-DWQ, reduction in solid waste in downstream water bodies and associated water quality improvements, high waste removal effectiveness and prevention from entering the downstream system, and a higher retention capacity of the solid waste during higher flow events. Additional design criteria include sizing the system to treat the peak flowrate resulting from a 1-year, 1-hour storm event, which varies from 03 to 0.5 in/hr with average of OA in/hr for most urban area in the state of California, facilitating inspections and maintenance twice per year at a minimum (after 1st or 2nd storm of the season and after any significant storm event) to remove accumulated waste, prevention of upstream flooding within the highway and other properties even if the system is fully dogged in accordance with Caltrans Highway Design Manual requirements, and enabling ponded water to drain within 96 hours in accordance with the maximum drawdown time allowed for urban structural systems by the Caltrans Statewide Stormwater Management Plan for vector control. Design criteria further include a minimum drain downslope of 1 percent and avoidance of creating a confined space or a permit-required confined space. The present invention meets these design objectives with the following configurations.

Figure 1:
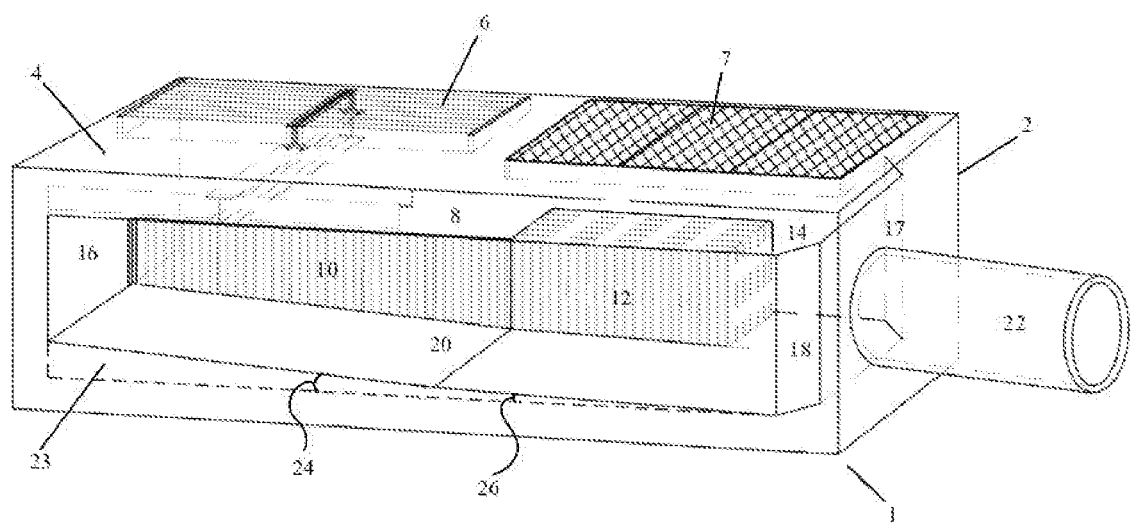
FIG. 1 illustrates an isometric view of an embodiment of the stormwater capture housing system.

As shown in FIG. 1, the stormwater capture housing system comprises a rectangular housing unit 1 with outer walls 2 that are made of a high strength composite material such as reinforced concrete. The top wall 4 of the housing unit is at grade level with the surrounding terrain and comprises an inflow grating configuration 6 located on one half of the top wall 4 and at least one filled inflow grating component 7 on the other half of the top wall. The inflow grating configuration 6 allows for draining of stormwater and solid waste directly from the roadway into the housing unit; the filled inflow grating component 7 allows for drainage of stormwater without solid waste. The inflow grating configuration 6 is positioned so that the stormwater and waste drain directly into a capture area 8 comprising a screen weir 10 and a screen box 12 that capture solid waste particles and debris carried by the stormwater flow. The screen box 12 is secured to an inside wall 14 of the housing unit. One end of the screen weir 10 is connected to the screen box 12 and the other end of the screen weir 10 is connected to another inside wall 16 of the housing unit. The water from the screen weir 10 and screen box 12 is filtered into a clean water zone comprised of a dimensioned area 18 at the end of the screen box 12 and a bypass channel 20 that runs parallel to the screen weir 10. The top of the screen weir 10 is at a lower elevation than the underside of the top wall 4 of the housing unit 1 to allow for an overflow of stormwater when necessary to maintain a desired hydraulic capacity rate at times of high flow and when there is a buildup of waste in the capture area 8. The filtered water in the clean water zone 18, 20 is extruded through an outlet pipe 22 at a side wall 17 of the housing unit. The filled inflow grating component 7, which is configured to only allow for drainage of water without solid waste, is positioned over the screen box 12 and clean areas 18, 20 of the housing unit. The bottom floor 23 of the housing unit comprises at least one positive slope 24, 26 to facilitate the flow of the water through the unit to the outlet pipe 22.

Figure 2:
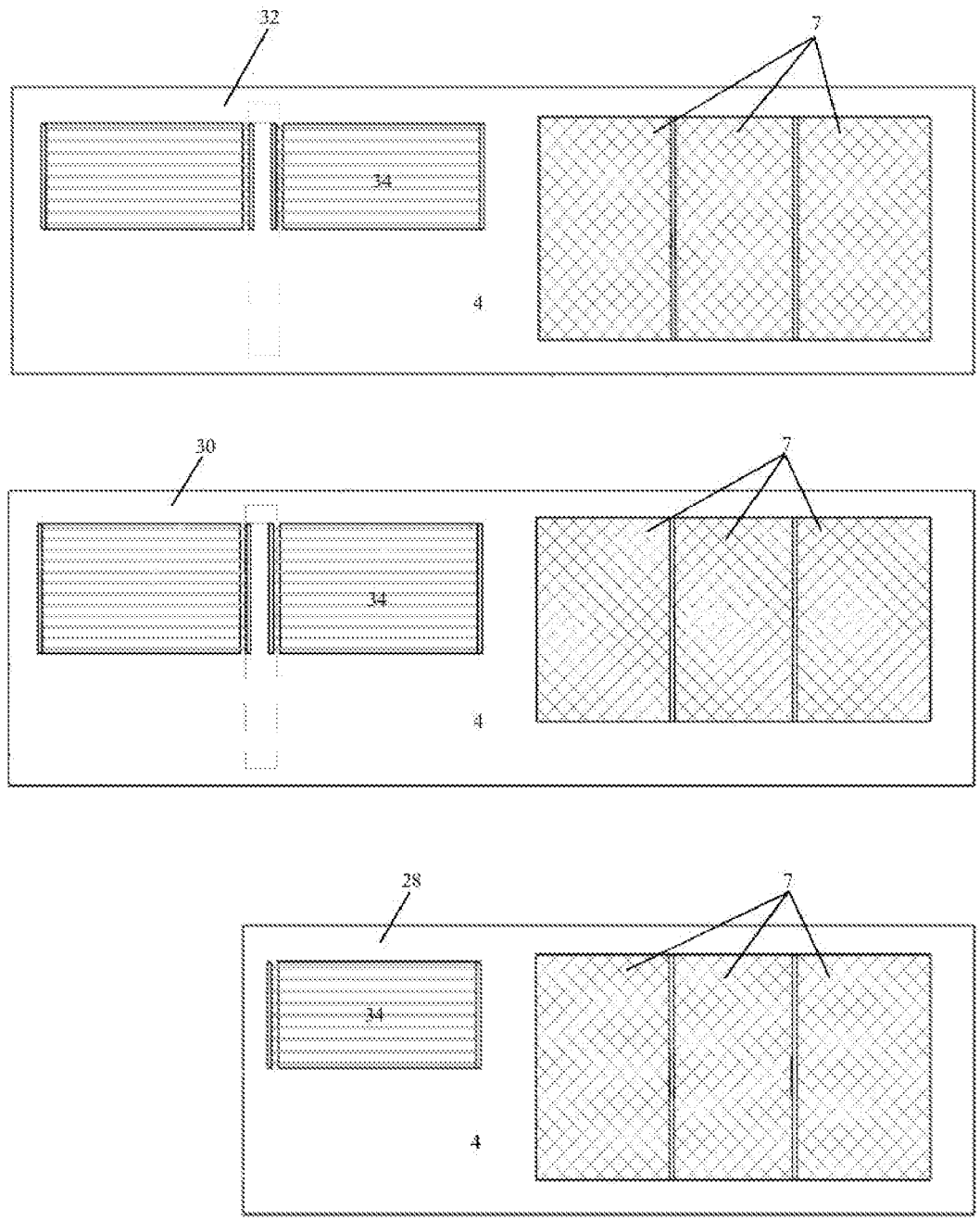
FIG. 2 illustrates a top side of inflow grating configurations.
Figure 3:
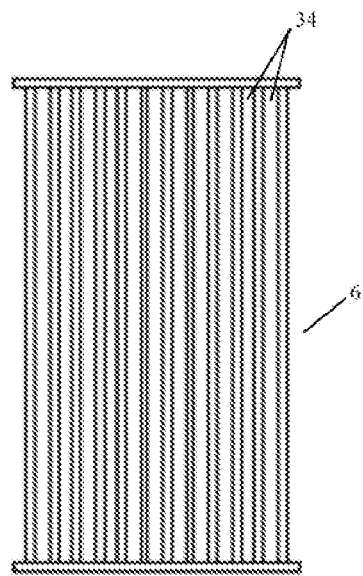
FIG. 3 illustrates a inflow grating slot configuration.
Figure 4:
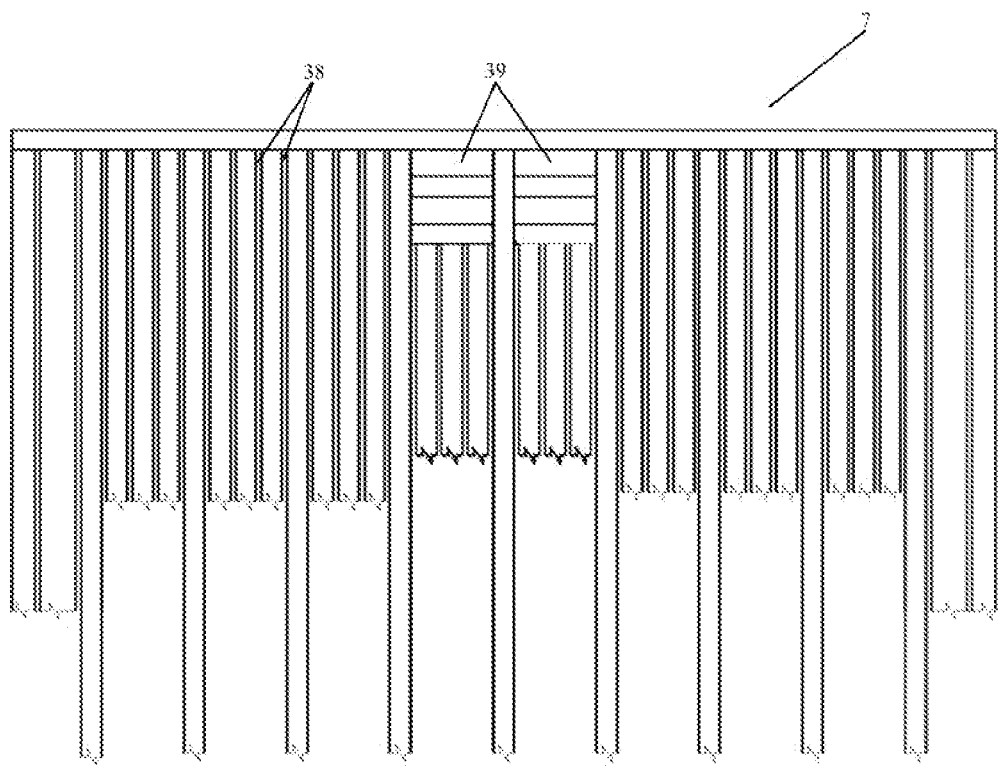
FIG. 4 illustrates a filled inflow grating configuration.

As shown in FIG. 2, the top wall 4 of the housing unit can have various inflow grating configurations 28, 30, 32 depending on site specific objectives and conditions. The inflow grating is configured to allow waste to pass through the slots 34 and fall into the subgrade capture area 8 of the housing unit. The inflow grating configurations include one or more grating components of varying dimensions, which determine the placement of the screen weir 10. The present invention is illustrated as having one 28 and two inflow grating components of varying sizes 30, 32 but is not limited to the quantity shown, as the sizing of the system determines the configuration of inflow grating components. Further, the top wall 4 may include one or more filled inflow grating components 7 that allow for stormwater to drain into the housing unit, but not solid waste particles. FIG. 3 shows an embodiment of the slot openings 34 within the inflow grating configuration 6, which can be configured to allow for drainage of solid waste according to the desired particle size. FIG. 4 shows an embodiment of the filled inflow grating component 7 with apertures 38 that are sized to prevent passage of solid waste. The filled inflow grating component provides for additional flow capacity to prevent ponding and flooding.

Figure 5:
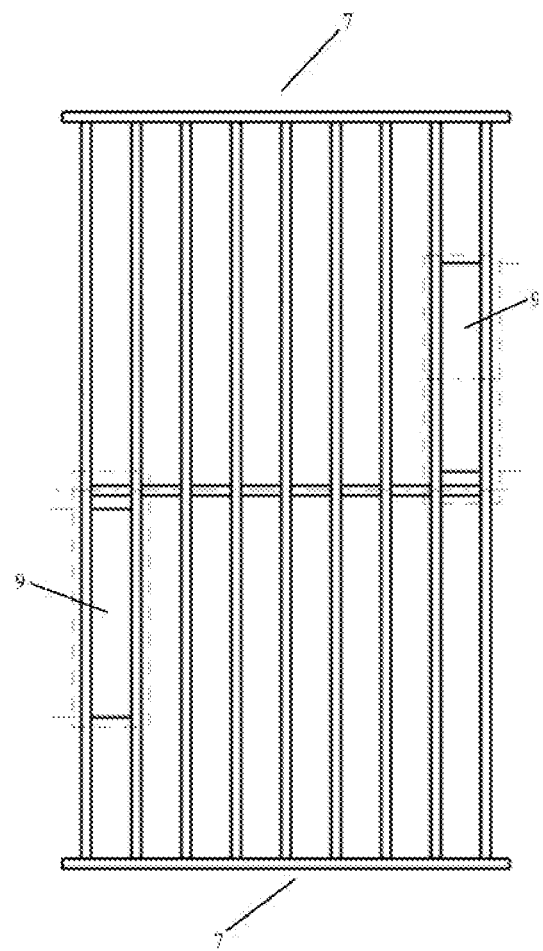
FIG. 5 illustrates a filled inflow grating with access port.
Figure 6:
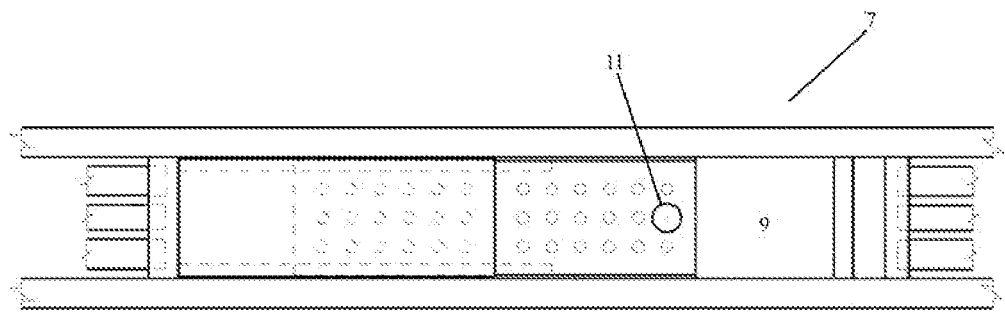
FIG. 6 illustrates a filled inflow grating with access port and handle.
Figure 7:
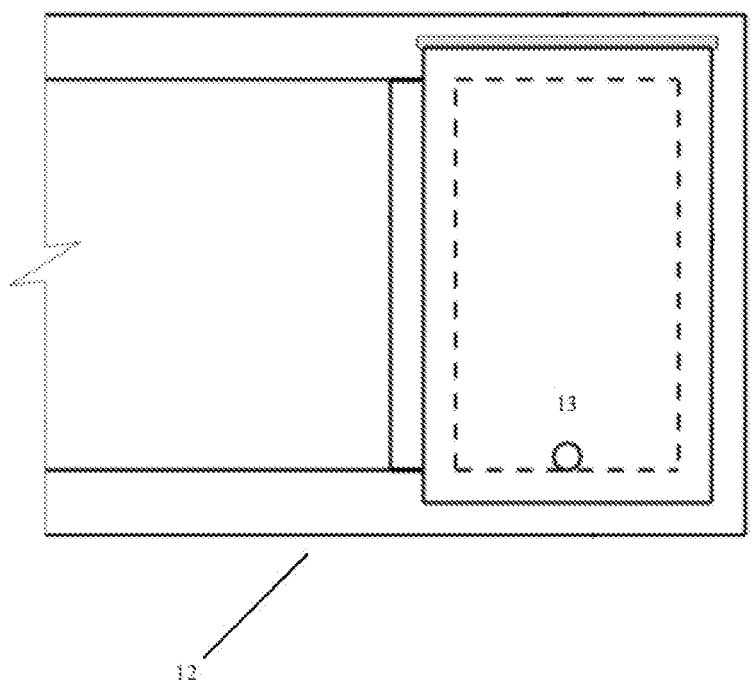
FIG. 7 illustrates a screen box lid opening element.

A preferred embodiment of the filled inflow grating component 7 includes at least one lifting element 39 to facilitate removal of the component 7 to enable a safe access for cleaning and maintenance, in addition to inspection and operations for mosquito and vector control. As shown in FIGS. 5 and 6, a preferred embodiment of the filled inflow grating component 7 further includes an access port 9 with a handle element 11 to facilitate inspection of the screen weir 10 and the screen box 12 below. A preferred embodiment of the screen box 12 includes a cover lid that can be lifted for inspection and access via an access element 13. The cover lid can also comprise two sections wherein each section has an access element 13 to enable lifting the cover lid, as shown in FIG. 7.

Figure 8:
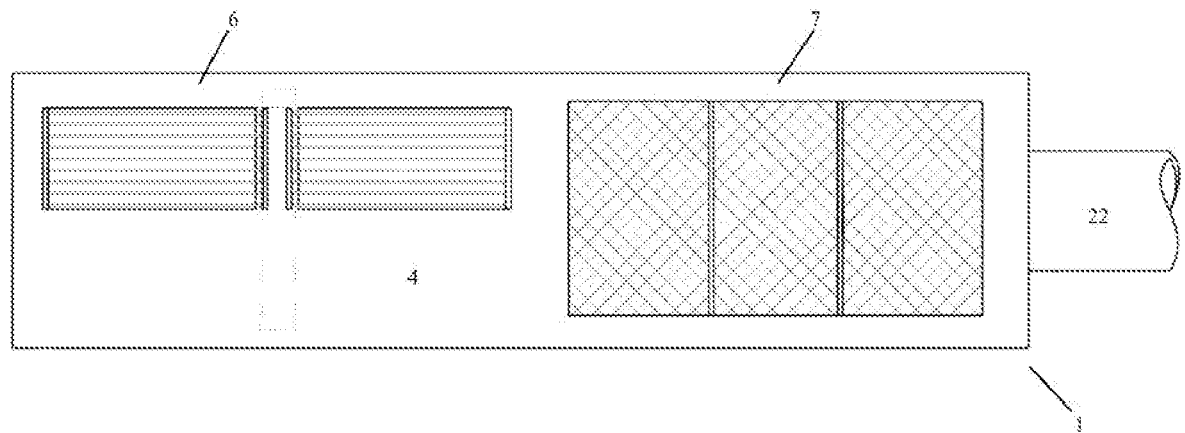
FIG. 8 illustrates a plan view with the top wall.

FIG. 8 shows a plan view of the top wall 4 of the present invention with the outlet pipe 22 protruding from the housing unit 1. This embodiment shows an inflow grating configuration 6 and a filled inflow grating component 7 on the top wall 4 of housing unit. The inflow grating configuration 6 and the filled inflow grating component 7 are made of a high yield, high tensile strength material, such as iron or steel, to provide strong, durable dead and live load support in varying roadway conditions and environments while also preventing flooding and ponding.

Figure 9:
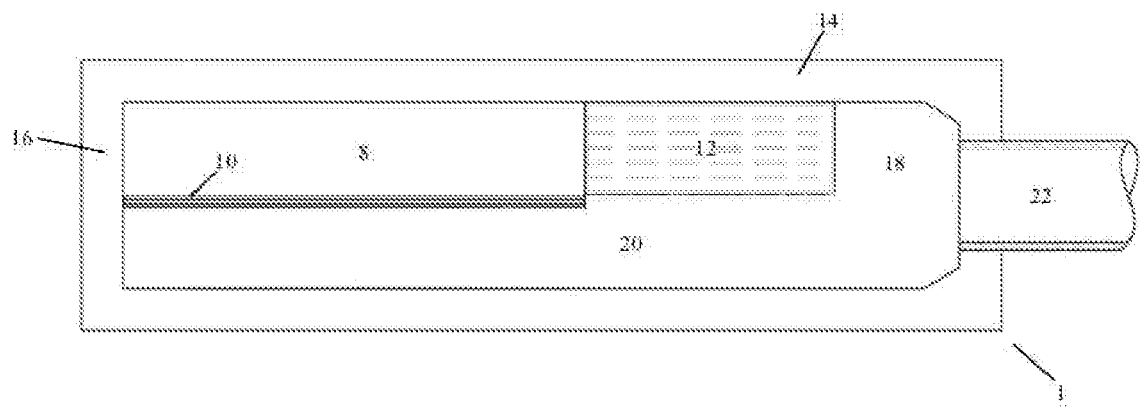
FIG. 9 illustrates a plan view without the top wall.

FIG. 9 shows a plan view of the present invention with the top wall of housing unit 1 removed from view. The screen weir 10 is attached at the side wall 16 and connected to the screen box 12 that is connected to a side wall 14. The stormwater falls through the inflow grating configuration 6 at grade level directly into the capture area 8 formed by the screen weir 10 and the screen box 12. Solid waste is collected within the capture area 8 while the water is filtered through screen weir 10 and screen box 12 into the clean zone 18, 20. The filtered water is expelled from the clean zone through the outlet pipe 22.

Figure 10:
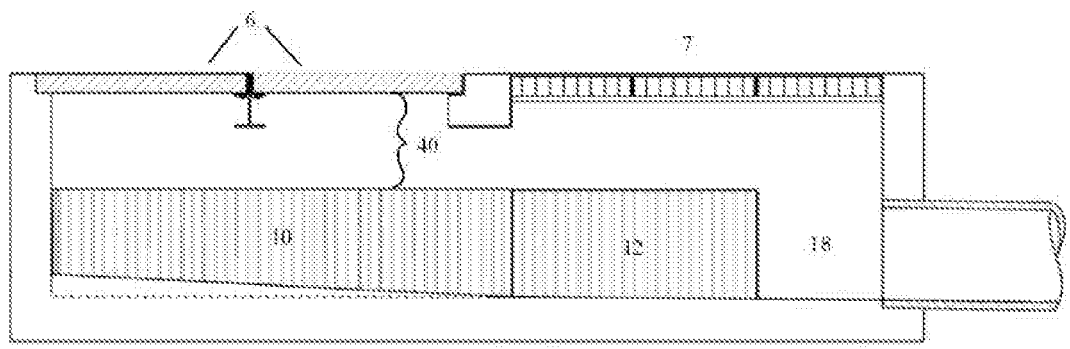
FIG. 10 illustrates a side view.

FIG. 10 shows a side view of the present invention. The inflow grating configuration 6 is designed to be located over the capture area 8 of the screen weir 10 and does not extend over the clean zone of the bypass channel 18 so that the stormwater carrying solid waste falls only into the capture area, also shown in FIG. 11. The top of the screen weir 10 does not extend to meet the underside of top wall of the housing unit, thereby creating a gap 40 that allows for an overflow of stormwater and solid waste buildup, while the screen box 12 contains the waste to a maximum capacity determined by the volume of the screen box 12. Since the inflow of water into the filled inflow grating component 7 does not carry solid waste, the filled inflow grating component 7 is positioned above the screen box 12, the clean area adjacent to the screen box, and a portion of the bypass channel 20.

Figure 11:
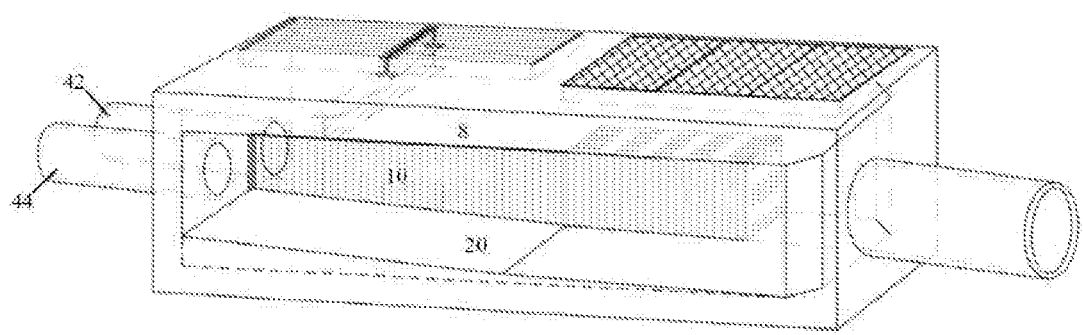
FIG. 11 illustrates an embodiment with inlet pipes.

The present invention includes embodiments that additionally have at least one inlet pipe 42 that directs untreated water from an upstream source into the capture area 8 of the screen weir 10 for potentially filtering waste particles from the water. Additional embodiments also include at least one inlet pipe 44 that directs treated or bypass water from an upstream source into the clean water zone of the bypass channel 20. As shown in FIG. 11, embodiments of the present invention also include a combination of at least one pipe 42 carrying water into the screen capture area 8 from an upstream source and at least one pipe 44 carrying treated or bypass water into the clean zone 20.

Figure 12:
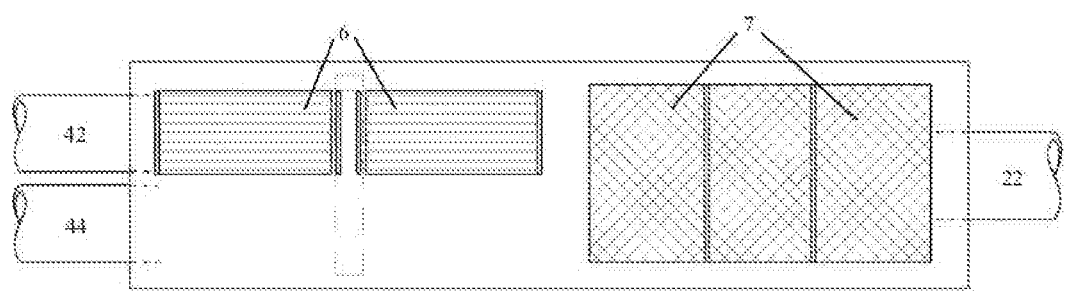
FIG. 12 illustrates a plan view with inlet pipes with the top wall.
Figure 13:
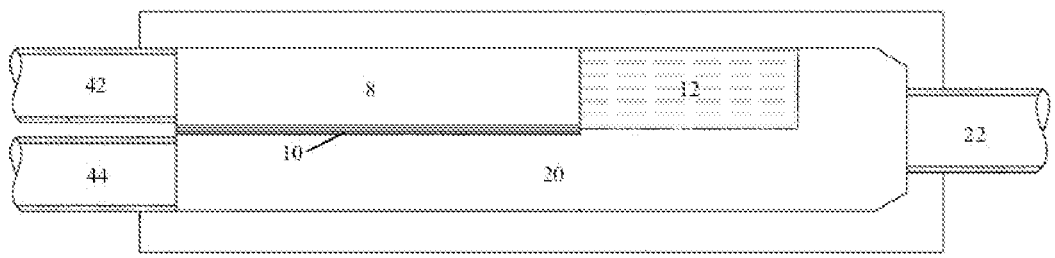
FIG. 13 illustrates a plan view with inlet pipes without the top wall.
Figure 14:
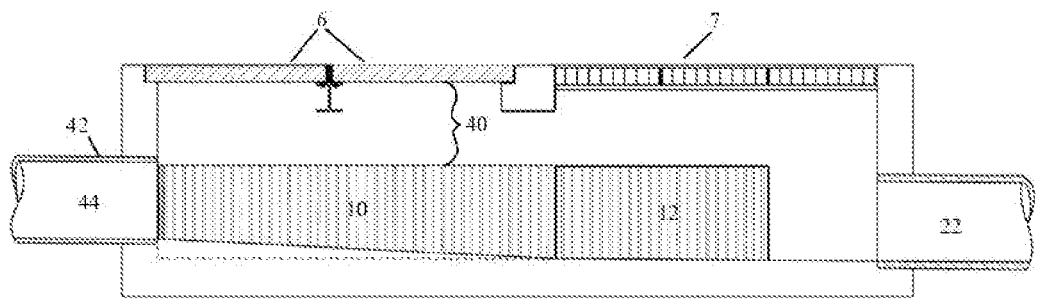
FIG. 14 illustrates a side with inlet pipes.

FIG. 12 shows a plan view of the embodiment with two inlet pipes 42, 44 from one or more upstream sources. FIG. 13 shows a plan view with the top wall removed from view. FIG. 12 shows a side view that includes the inlet pipes 42, 44. The inlet pipe 42 carrying untreated water into the housing unit is shown to be in line with the inflow grating configuration 6 that is directly above the capture area 8 of the screen weir 10. The inlet pipe 42 directs the untreated water into the capture area 8 so that waste will be contained within the screen box 12 or by the screen weir 10. Any overflow of water and waste from the capture area 8 runs over the top of the screen weir 10, enabled by the gap 40 created by the height of the screen weir 10 as shown in FIG. 14. The inlet pipe 44 carrying treated or bypass water from an upstream source feeds into the clean zone of the bypass channel 20. The drainage from the filled inflow grating component 7 falls into the screen box 12 and the clean areas 18, 20. The outlet pipe 22 is shown at the opposite end as the inlet pipes 42, 44.

Figure 15:
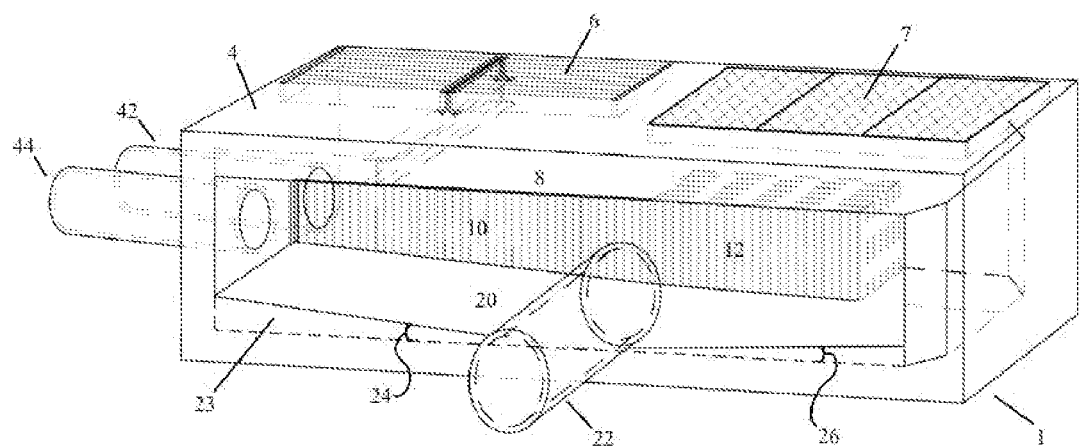
FIG. 15 illustrates an embodiment with an outlet located at the side, perpendicular to the inlet.
Figure 16:
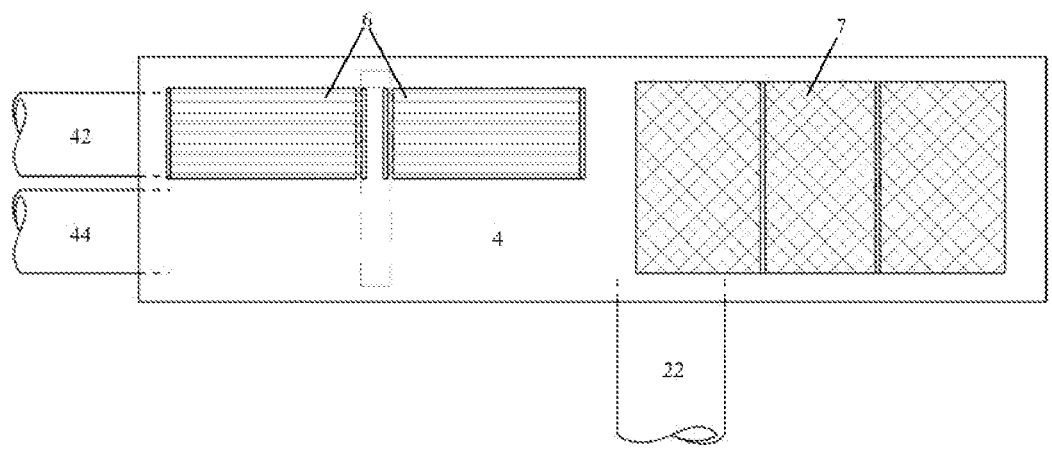
FIG. 16 illustrates a plan view of the outlet at the side with the top wall.
Figure 17:
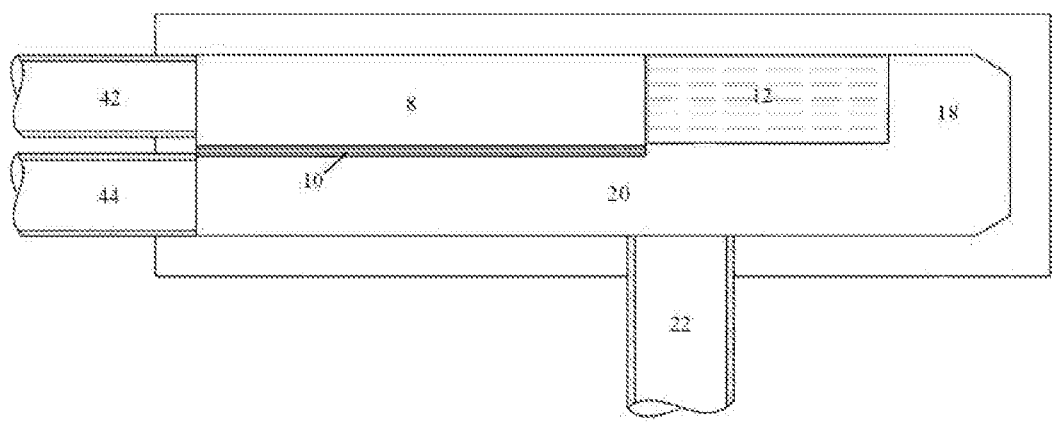
FIG. 17 illustrates a plan view of the outlet at the side without the top wall.
Figure 18:
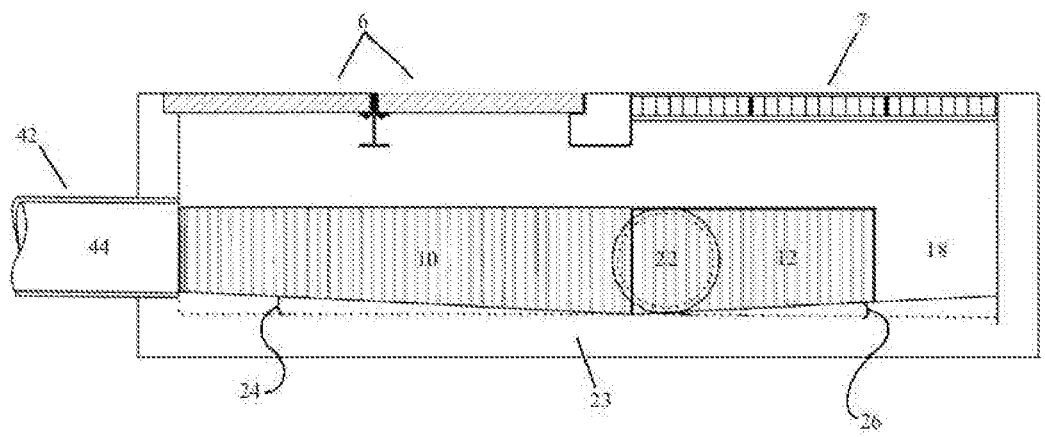
FIG. 18 illustrates a side view of the outlet at the side.

FIG. 15 shows an embodiment with an outlet pipe 22 located at the side of the housing unit 1, perpendicular to the inlet pipes 42, 44. The outlet pipe 22 extends from the clean zone of the bypass channel 20. FIG. 16 shows a plan view with the outlet 22 at the side and with the top wall 4 in place. FIG. 17 shows a plan view with the outlet 22 at the side and without the top wall. FIG. 18 shows a side view of the outlet 22 extending through the side wall. In this configuration, the bottom wall 23 of the housing unit is sloped 24, 26 to allow for drainage into the outlet pipe 22. The inlet pipe 42 from an upstream source feeds the capture area 8 of the screen weir 10. The inlet pipe 44 feeds into the clean zone of the bypass channel 20. The inflow grating configuration 6 is positioned for the stormwater from the surface level to drain into the capture area 8 and does not extend past the screen weir 10. The filled inflow grating component 7 is positioned over the screen box 12, the clean area 18, and a portion of the bypass channel 20.

Figure 19:
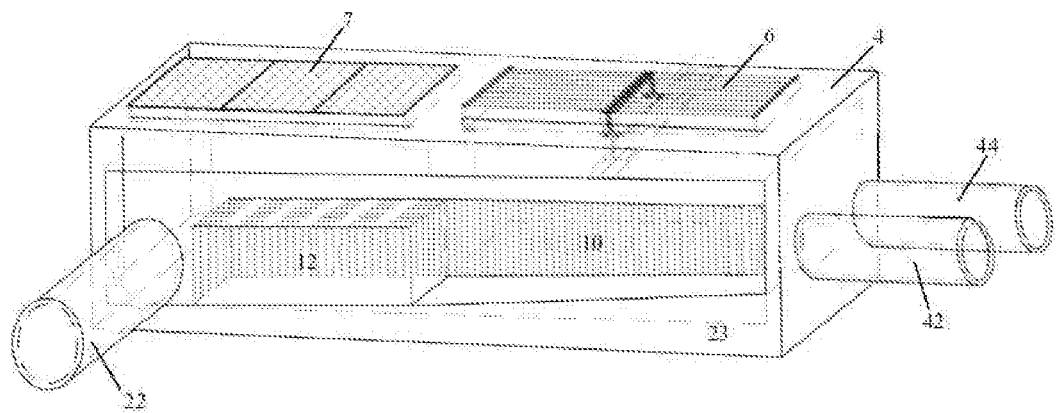
FIG. 19 illustrates an embodiment with a side outlet at a side wall, located perpendicular to the inlet.
Figure 20:
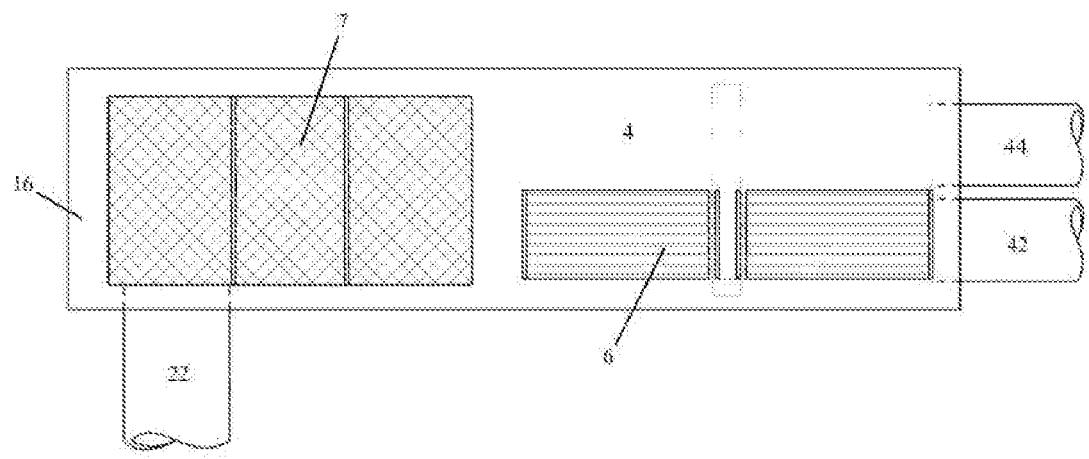
FIG. 20 illustrates a plan view of the side outlet a side wall with the top wall.
Figure 21:
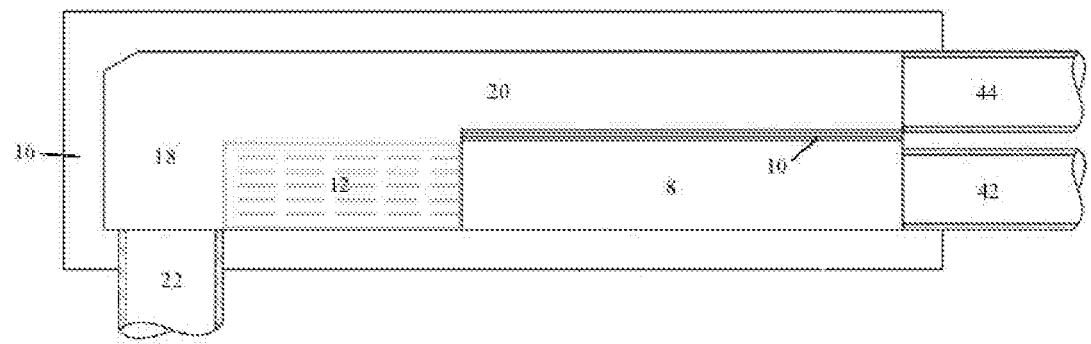
FIG. 21 illustrates a plan view of the side outlet a side wall without the top wall.
Figure 22:
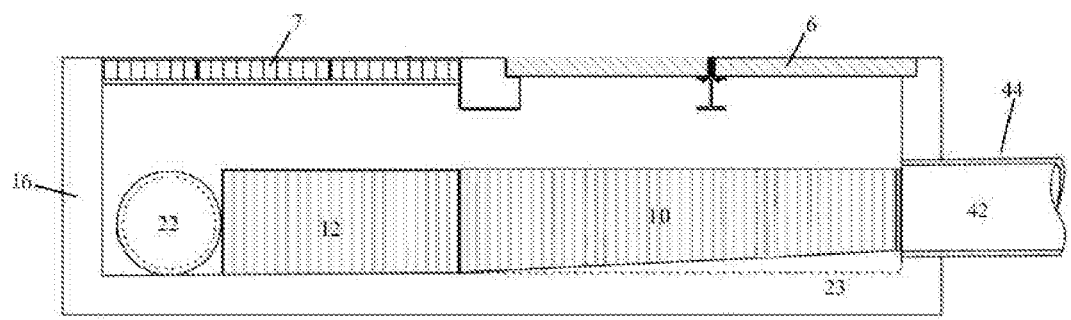
FIG. 22 illustrates a side view of the side outlet a side wall.

FIG. 19 shows an embodiment with a side outlet 22 located at a side wall of the housing unit with the inlet pipes 42, 44 at the opposite end and perpendicular to the inlets. FIG. 20 shows a plan view of the side outlet 22 at the side wall with the top wall 4. FIG. 21 shows a plan view of the side outlet 22 at the side wall without the top wall. FIG. 22 shows a side view of the side outlet 22 at the side wall of the housing unit. The bottom wall 23 is sloped to facilitate water flow into the clean water zone 18 that feeds into the outlet 22.

Figure 23:
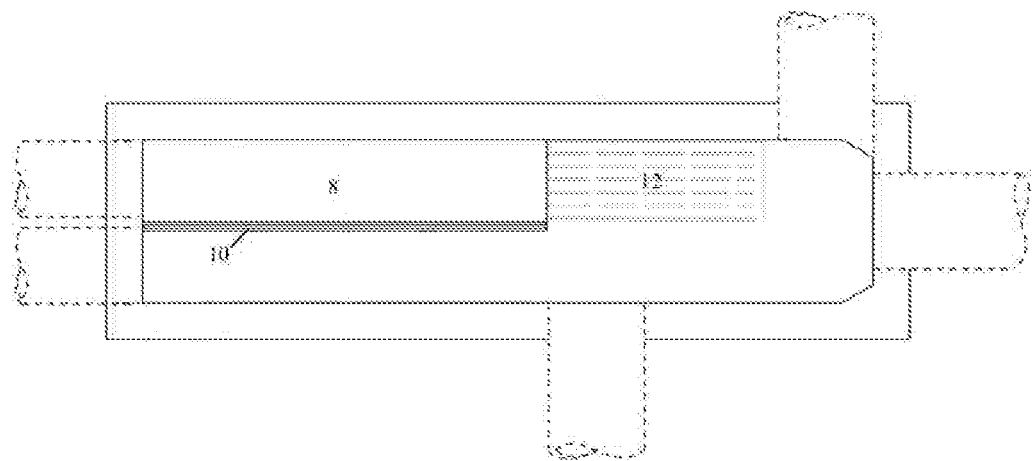
FIG. 23 illustrates a top view showing small grating, evenly connected weir screen, and pipe locations.
Figure 24:
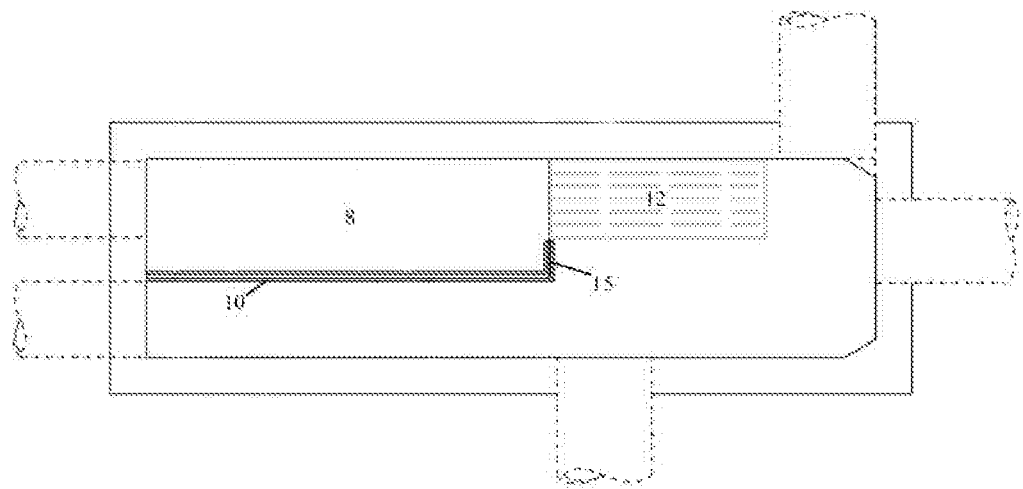
FIG. 24 illustrates a top view showing larger grating, offset weir screen, and pipe locations.

Each of the embodiments described are based on specific objectives and requirements for the capture housing system, including flow rate, particle size, and dimensions, that maintain a strong hydraulic capacity. The inflow grating configuration 6 determines the placement of the screen weir 10, as drainage from the inflow grating configuration is designed to fall into the capture area 8 of the screen weir 10. FIG. 23 shows a plan view with the top wall removed wherein the screen weir 10 lines up evenly with the screen box 12 due to the grating configuration of the top wall. FIG. 24 shows a plan view with the top wall removed wherein the inflow grating configuration is larger and, as such, the screen weir 10 is offset 15 from the screen box 12. In both figures, the screen weirs 10 are located so that the stormwater that runs through the inflow grating configuration 6 falls into the capture areas 8.

The preferred embodiment is specific to the field conditions and project objectives for the stormwater capture housing system. However, the preferred embodiment would nonetheless comprise the afore-mentioned elements previously discussed. Each embodiment is understood to include fastener elements and attachment components that may be tailored to specific field conditions and performance requirements. Although the present invention has been described in considerable detail with reference to certain preferred versions thereof, other versions are possible. Therefore, the spirit and scope of the appended claims should not be limited to the description of the preferred versions contained herein.

Insofar as the description above and the accompanying drawings disclose any additional subject matter that is not within the scope of the single claim below, the inventions are not dedicated to the public and the right to file one or more applications to claim such additional inventions is reserved.

The invention claimed is:

1. A system for filtering stormwater comprising:
a rectangular housing unit including a top wall, a bottom floor, and four side walls;
an inflow grating configuration located on a first half of said top wall and configured to allow for draining of stormwater and solid waste from a roadway;
at least one filled inflow grating component located on a second half of said top wall and configured to only allow for drainage of stormwater without solid waste;
a capture area configured so that stormwater passing through said inflow grating configuration falls only into said capture area wherein solid waste is contained by a screen box and a screen weir,
wherein said screen box is secured to a first of said four side walls, and
wherein a first end of said screen weir is connected to said screen box, a second end of said screen weir is connected to a second of said four side walls, and a top edge of said screen weir is configured to be at a lower elevation than said top wall to create a gap that allows for an overflow of stormwater such that a desired hydraulic capacity rate is maintained at times of high flow and when there is a buildup of solid waste in said capture area;
a clean water zone comprising a dimensioned area located between said screen box and a third of said four side walls and further comprising a bypass channel that runs parallel to said screen weir, wherein said screen weir is configured so that stormwater draining from said inflow grating configuration only falls into said capture area and not into said clean water zone;
an outlet pipe at one of said four side walls in said clean zone, wherein filtered water in said clean water zone is extruded through said outlet pipe; and
wherein said bottom floor comprises at least one positive slope to facilitate waterflow through said rectangular housing unit to said outlet pipe.

2. The system for filtering stormwater according to claim 1, wherein said filled inflow grating component includes at least one lifting element to facilitate removal of said filled inflow grating component.

3. The system for filtering stormwater according to claim 2, wherein said filled inflow grating component further includes an access port with a handle element to facilitate inspection of said screen weir and screen box.

4. The system for filtering stormwater according to claim 3, wherein said screen box includes a cover lid comprising two sections and wherein each section has an access element to enable lifting said cover lid.

5. The system for filtering stormwater according to claim 4, further comprising at least one filter pipe that directs water from an upstream source into said capture area of said screen weir for filtering solid waste from the water.

6. The system for filtering stormwater according to claim 4, further comprising at least one bypass pipe that directs water from an upstream source into said clean water zone of said bypass channel.

7. The system for filtering stormwater according to claim 4, further comprising at least one filter pipe that directs water from an upstream source into said capture area of said screen weir for filtering solid water from the water and at least one bypass pipe that directs water from an upstream source into said clean water zone of said bypass channel.

8. The system for filtering stormwater according to claim 4, wherein said screen weir is offset from said screen box due to sizing of said inflow grating configuration so that stormwater draining through said inflow grating configuration falls only into said capture areas.

9. The system for filtering stormwater according to claim 4, wherein said outlet pipe is configured in a perpendicular orientation to said bypass channel.

10. The system for filtering stormwater according to claim 4, wherein said outlet pipe is configured at an angle to said bypass channel.

11. A system for filtering stormwater comprising:
a rectangular housing unit including a top wall, a bottom floor, and four side walls;
an inflow grating configuration comprising two or more grates and located on a first half of said top wall and configured to allow for draining of stormwater and solid waste from a roadway;
at least one filled inflow grating component located on a second half of said top wall and configured to only allow for drainage of stormwater without solid waste;
a capture area configured so that stormwater passing through said inflow grating configuration falls only into said capture area wherein solid waste is contained by a screen box and a screen weir,
wherein said screen box is secured to a first of said four side walls, and
wherein a first end of said screen weir is connected to said screen box, a second end of said screen weir is connected to a second of said four side walls, and a top edge of said screen weir is configured to be at a lower elevation than said top wall to create a gap that allows for an overflow of stormwater such that a desired hydraulic capacity rate is maintained at times of high flow and when there is a buildup of solid waste in said capture area;
a clean water zone comprising a dimensioned area located between said screen box and a third of said four side walls and further comprising a bypass channel that runs parallel to said screen weir, wherein said screen weir is configured so that stormwater draining from said inflow grating configuration only falls into said capture area and not into said clean water zone;
an outlet pipe at one of said four side walls in said clean zone, wherein filtered water in said clean water zone is extruded through said outlet pipe; and
wherein said bottom floor comprises at least one positive slope to facilitate waterflow through said rectangular housing unit to said outlet pipe.

12. The system for filtering stormwater according to claim 9, wherein said filled inflow grating component includes at least one lifting element to facilitate removal of said filled inflow grating component.

13. The system for filtering stormwater according to claim 10, wherein said filled inflow grating component further includes an access port with a handle element to facilitate inspection of said screen weir and screen box.

14. The system for filtering stormwater according to claim 11, wherein said screen box includes a cover lid comprising two sections and wherein each section has an access element to enable lifting said cover lid.

15. The system for filtering stormwater according to claim 12, further comprising at least one filter pipe that directs water from an upstream source into said capture area of said screen weir for filtering solid waste from the water.

16. The system for filtering stormwater according to claim 12, further comprising at least one bypass pipe that directs water from an upstream source into said clean water zone of said bypass channel.

17. The system for filtering stormwater according to claim 12, further comprising at least one filter pipe that directs water from an upstream source into said capture area of said screen weir for filtering solid water from the water and at least one bypass pipe that directs water from an upstream source into said clean water zone of said bypass channel.

18. The system for filtering stormwater according to claim 12, wherein said screen weir is offset from said screen box due to sizing of said inflow grating configuration so that stormwater draining through said inflow grating configuration falls only into said capture areas.

19. The system for filtering stormwater according to claim 12, wherein said outlet pipe is configured in a perpendicular orientation to said bypass channel.

20. The system for filtering stormwater according to claim 12, wherein said outlet pipe is configured at an angle to said bypass channel.

* * * * *